(12) United States Patent
Tanaka et al.

(10) Patent No.: US 8,428,108 B2
(45) Date of Patent: Apr. 23, 2013

(54) SIGNAL PROCESSING APPARATUS, INFORMATION PROCESSING APPARATUS, SIGNAL PROCESSING METHOD, DATA DISPLAY METHOD, AND PROGRAM

(75) Inventors: Katsuyuki Tanaka, Kanagawa (JP); Manabu Nitta, Tokyo (JP); Hideki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/713,715

(22) Filed: Feb. 26, 2010

(65) Prior Publication Data

US 2010/0254437 A1  Oct. 7, 2010

(30) Foreign Application Priority Data

Apr. 1, 2009  (JP) ................. 2009-089218

(51) Int. Cl.
 *H04B 1/00* (2006.01)
(52) U.S. Cl.
 USPC ........... 375/149; 375/130; 375/141; 375/145; 375/146; 375/147; 375/354; 375/364; 375/365; 375/366; 375/368; 370/320; 370/334; 370/335; 370/342; 370/441; 370/479; 370/503; 370/509; 370/510
(58) Field of Classification Search ........... 375/130, 375/141, 145, 146, 147, 149, 354, 364, 365, 375/366, 368; 370/320, 334, 335, 342, 441, 370/479, 503, 509, 510
See application file for complete search history.

(56) References Cited

U.S. PATENT DOCUMENTS

| 4,839,656 A * | 6/1989 | O'Neill et al. ............. 342/357.2 |
| 2004/0006444 A1 | 1/2004 | Kang et al. |
| 2007/0291825 A1 * | 12/2007 | Endoh et al. .................. 375/147 |

FOREIGN PATENT DOCUMENTS

| EP | 1 560 036 A1 | 8/2005 |
| JP | 2000-249754 | 9/2000 |
| JP | 2007-78703 | 3/2007 |
| JP | 3949576 | 4/2007 |
| JP | 4060038 | 12/2007 |

* cited by examiner

*Primary Examiner* — Leon Flores
(74) *Attorney, Agent, or Firm* — Oblon, Spivak, McClelland, Maier & Neustadt, L.L.P.

(57) ABSTRACT

In a signal processing apparatus a synchronizer acquires synchronization with the spreading code of an intermediate frequency signal converted from a signal received from a satellite in a global positioning system. A demodulator then demodulates a message contained in the intermediate frequency signal. A measuring unit outputs a primary signal to a predetermined signal line, the primary signal expressing positioning results for the apparatus as measured on the basis of the demodulated message. A secondary signal output unit attaches a predetermined header to a secondary signal and outputs the result to the predetermined signal line, the secondary signal containing at least the intermediate frequency signal, or a signal generated from the intermediate frequency signal.

12 Claims, 14 Drawing Sheets

FIG. 6
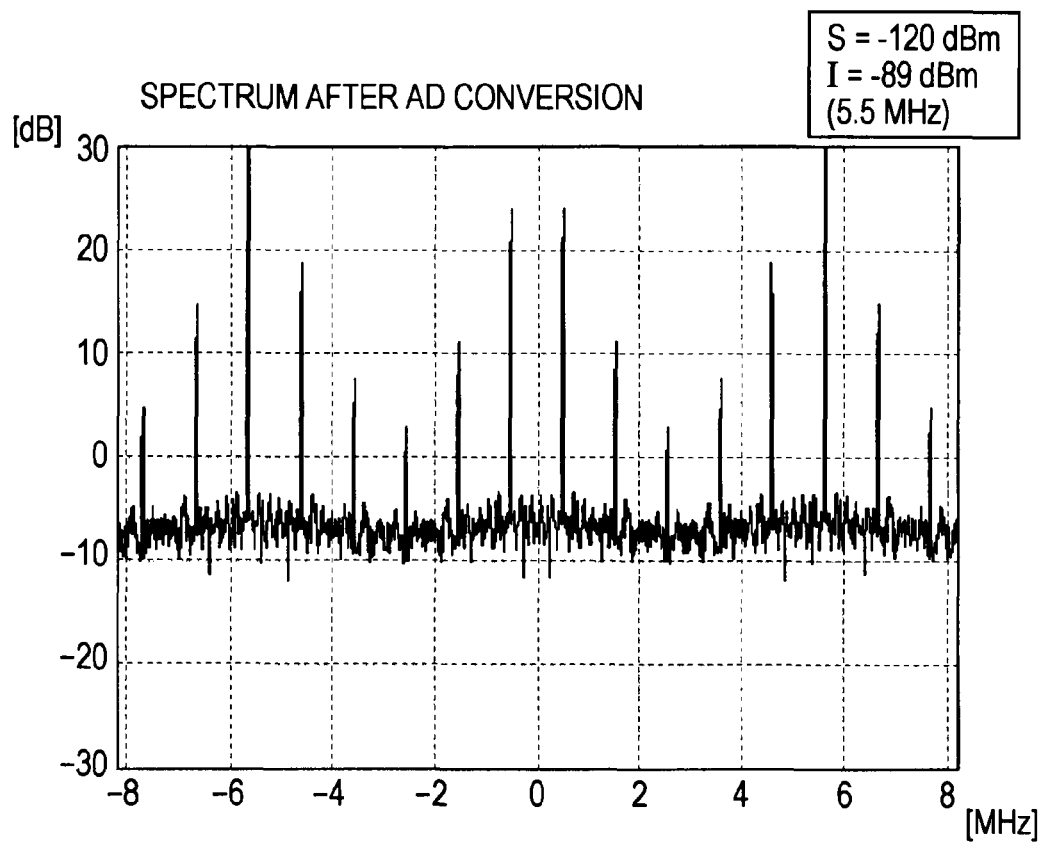
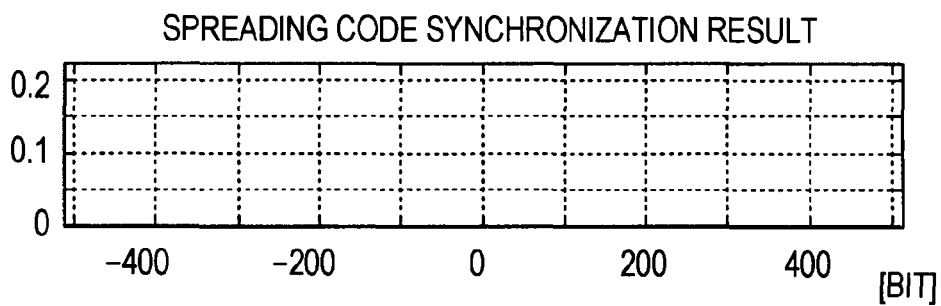

FIG. 10

| PATTERN | SIGNAL SUPPLIER | INPUT SIGNAL | PROCESSING | OUTPUT SIGNAL (SECONDARY SIGNAL) |
|---|---|---|---|---|
| 1 | FREQUENCY CONVERTER | IF SIGNAL | FINITE LENGTH EXTRACTION | IF SIGNAL |
| 2 | FREQUENCY CONVERTER | IF SIGNAL | FFT | FREQUENCY SPECTRUM |
| 3 | FREQUENCY CONVERTER | IF SIGNAL | FFT/STATISTICAL ANALYSIS | STATISTICAL DATA |
| 4 | SYNCHRONIZER | FREQUENCY SPECTRUM | — | FREQUENCY SPECTRUM |
| 5 | SYNCHRONIZER | FREQUENCY SPECTRUM | STATISTICAL ANALYSIS | STATISTICAL DATA |

SIGNAL PROCESSING APPARATUS, INFORMATION PROCESSING APPARATUS, SIGNAL PROCESSING METHOD, DATA DISPLAY METHOD, AND PROGRAM

BACKGROUND OF THE INVENTION

1. Field of the Invention

The present invention relates to a signal processing apparatus, an information processing apparatus, a signal processing method, a data display method, and a program.

2. Description of the Related Art

A variety of electronic devices (such as car navigation equipment, mobile phones, and digital still cameras) are now being equipped with positioning functions that utilize the Global Positioning System (GPS). Typically, when utilizing GPS in an electronic device, a GPS module receives signals from four or more GPS satellites, the device's position is measured on the basis of the incoming signals, and the user is informed of the measurement results via the screen of a display apparatus or similar component. More specifically, the GPS module demodulates the incoming signals to acquired orbital data for each GPS satellite, and then uses a system of equations to derive the three-dimensional position of the device from the orbital data, time information, and delay times of the incoming signals. Signals are received from four or more GPS satellites in order to eliminate the effects of clock error between the module and the satellites.

Herein, a signal transmitted from a GPS satellite (L1-band, C/A code) is a spread spectrum signal wherein 50 bps data has been spread using Gold code with a code length of 1023 and a chip rate of 1.023 MHz, and furthermore wherein the signal has been Binary Phase Shift Keying (BPSK) modulated using a 1575.42 MHz carrier. Consequently, reception of the above signals from GPS satellites by the GPS module involves spreading code, carrier, and data synchronization.

Generally, a GPS module provided in an electronic device first frequency-converts the carrier frequency of an incoming signal to an intermediate frequency (IF) of several MHz, and then conducts synchronization and other processing. A typical intermediate frequency may be 4.092 MHz, 1.023 MHz, or 0 Hz, for example. Normally, the signal strength of an incoming signal is smaller than the signal strength of thermal noise, with the S/N ratio falling below 0 dB. However, demodulating the signal is made possible by the process gain of spread spectrum techniques. In the case of a GPS signal, the process gain with respect to a 1 bit data length may be ($10*\log[1.023 \text{ MHz}/50]$), or approximately 43 dB.

As described above, the market for electronic devices equipped with a GPS module is growing. On the performance side, signal sensitivity is being enhanced, and GPS modules having signal sensitivities between −150 dBm to −160 dBm are becoming common. However, as GPS modules are becoming more widespread, the electronic devices equipped with GPS modules are also increasing in performance. The unwanted electromagnetic radiation that emanates from the electronic device as a result becomes noise, and in a growing number of case, the inherent performance of the module is not experienced. Noise emanating from the electronic device can be caused by various factors, such as internal couplings in the wiring of the electronic device, a clock that interferes spatially, the harmonic components of high-speed signals passing through a data bus or similar component, circuit load fluctuations, and power fluctuations by a switching regulator.

If the external noise described above is introduced into the analog circuits of the GPS module from the electronic device, then signal sensitivity is degraded. Such degradation in signal sensitivity does not pose a problem is the signal strength of the external noise is less than or on the order of the signal strength of the steady thermal noise produced by the GPS module (approximately −111 dBm when computed at 2 MHz bandwidth). However, when the signal strength of the external noise approaches and exceeds the signal strength of the thermal noise, signal sensitivity degrades to the extent that the level of the steady thermal noise is exceeded. Furthermore, if the inverse ratio of the incoming signal versus the sum of the thermal and external noise (hereinafter, S/(N+I)) approaches the process gain, GPS signals might no longer be detected. Even in the case where the inverse of S/(N+I) is sufficiently smaller than the process gain, the thermal noise and the GPS signal will be constrained if the voltage value in the circuit is saturated by strong external noise, for example. As a result, signal sensitivity drops sharply. Particularly, the total amplification is 100 dB or more in the case of a typical GPS module, while the resolution of analog-to-digital (AD) conversion is 1 or 2 bits. In this case, positioning is basically carried out in a state where the thermal noise and the GPS signal are saturated to some degree. For this reason, if external noise with a high signal strength is input, then the AD-converted output signal ultimately output by the analog circuit will be readily saturated.

Consequently, in order to efficiently elicit the performance of a GPS module provided in an electronic device, there is a demand for countermeasures against noise, such as the unwanted radiation emanating from the electronic device. For example, a shielding material or shielding case might be used. As another example, features such as the circuit board structure, antenna shape, and layout of elements may be optimized during the design of the electronic device, such that noise pickup by the antenna is minimized. These countermeasures can therefore affect the design, cost, and development period of electronic devices.

Consequently, a noise rating apparatus has been proposed, able to quantitatively rate noise with high precision by weighting the levels of noise entering a GPS module according to frequency (see, for example, Japanese Patent No. 4060038). Additionally, there have been proposed methods for detecting anomalous level assumed to noise by using, for example, the correlation between the C/A code of a non-existent satellite and an IF signal (see, for example, Japanese Patent No. 3949576, and Japanese Unexamined Patent Application Publication Nos. 2007-78703 and 2000-249754).

SUMMARY OF THE INVENTION

However, the method disclosed in the above Japanese Patent No. 4060038, for example, may not be effective for optimizing electronic device design, since the scale of the apparatus itself is increased as a result. Furthermore, noise appearing in signals passing through the GPS module is not directly observed in the above method. Meanwhile, in the methods disclosed in Japanese Patent No. 3949576 and Japanese Unexamined Patent Application Publication Nos. 2007-78703 and 2000-249754, not enough information is provided in order to identify the cause of the noise, since only the noise level is observed. Generally, directly observing external noise entering the GPS module in order to optimize electronic device design is difficult for the following reasons.

For example, when using a spectrum analyzer to observe radio frequency (RF) signals directly from the antenna, the GPS signal level is lower than that of the thermal noise, as described above, and thus the level of the external noise to be observed is also low. Thus, a low-noise amplifier may be placed upstream so that the noise to be observed is not buried in the noise of the spectrum analyzer itself. However, a port or terminal for observation might not be available, such as in the case where the antenna is integrated onto the circuit board.

As another example, a spectrum analyzer may be used to observe an IF signal that has been converted from the carrier frequency of an incoming signal. Although the signal level is sufficiently amplified at that point, in some cases a port or terminal for acquiring the IF signal is not provided on the IC of an integrated GPS module. Furthermore, even if the IF signal can be acquired via a port, the IF signal is an AD-converted digital signal with a resolution of 2 bits or more, and thus it is difficult to observe the IF signal by simply using a spectrum analyzer that accepts analog signals.

Moreover, in some cases it is also difficult to draw out leads for observing signals with a spectrum analyzer from recent GPS modules, which have become increasingly more compact. Also, when testing costs are considered, the use of an expensive spectrum analyzer can itself become a demerit.

In light of the above, it is desirable to provide a signal processing apparatus, an information processing apparatus, a signal processing method, a data display method, and a program enabling efficient observation and analysis of noise appearing in signals passing through a GPS module.

A signal processing apparatus in accordance with an embodiment of the present invention includes: a synchronizer configured to acquire synchronization with the spreading code of an intermediate frequency signal that is obtained by converting the frequency of a received signal into a predetermined intermediate frequency, wherein the received signal is received from a satellite in a global positioning system; a demodulator configured to demodulate a message contained in the intermediate frequency signal synchronized by the synchronizer; a measuring unit configured to output a primary signal to a predetermined signal line, wherein the primary signal expresses the results of measuring at least one from among the position, velocity, and time of the apparatus as measured on the basis of the message that was demodulated by the demodulator; and a secondary signal output unit configured to attach a predetermined header to a secondary signal and output the result to the predetermined signal line, wherein the secondary signal contains at least the intermediate frequency signal, or a signal generated from the intermediate frequency signal.

According to such a configuration, a secondary signal containing the intermediate frequency signal (IF signal) and/or a signal generated from the IF signal is output from the signal processing apparatus using a signal line for outputting a primary signal expressing the positioning results. As a result, by connecting an electronic device to this signal line, it becomes possible to acquire information such as the IF signal spectrum and statistical data and directly observe noise conditions, without additional wiring. Herein, such a signal processing apparatus may be equivalent to, for example, a GPS module 110 in accordance with an embodiment of the present invention, to be hereinafter described.

The secondary signal may also contain a signal expressing a frequency spectrum generated by applying a Fourier transform to the intermediate frequency signal.

The secondary signal may also contain a signal expressing data obtained by statistically analyzing a frequency spectrum generated as a result of applying a Fourier transform to the intermediate frequency signal.

The signal processing apparatus may also include a frequency converter configured to generate the intermediate frequency signal by converting the frequency of a received signal into a predetermined intermediate frequency, wherein the received signal is received from a satellite in a global positioning system.

The secondary signal output unit may also be configured to attach to the secondary signal a header that contains an ID code for identifying the type of signal included in the secondary signal.

An information processing apparatus in accordance with another embodiment of the present invention includes: a primary signal acquirer configured to acquire a primary signal from a predetermined signal line, wherein the primary signal expresses at least one from among the position, velocity, and time of the apparatus as measured on the basis of an intermediate frequency signal obtained by converting the frequency of a received signal into an intermediate frequency, and wherein the received signal is received from a satellite in a global positioning system; a secondary signal acquirer configured to acquire a secondary signal from the predetermined signal line, wherein the secondary signal contains at least the intermediate frequency signal, or a signal generated from the intermediate frequency signal; and a display unit able to display, on a given screen, data corresponding to the primary signal acquired by the primary signal acquirer, as well as data corresponding to the secondary signal acquired by the secondary signal acquirer.

According to such a configuration, not only is a primary signal expressing positioning results acquired from a signal line, but also a secondary signal containing the IF signal and/or a signal generated from the IF signal. Data corresponding to the secondary signal is then displayed on a given screen. In so doing, the user is able to directly observe noise conditions introduced into the GPS module by referring to the screen. Herein, such an information processing apparatus may be equivalent to, for example, a display module 160 in accordance with an embodiment of the present invention, to be hereinafter described.

The secondary signal may also contain the intermediate frequency signal, with the apparatus further including a data processor configured to generate a frequency spectrum by applying a Fourier transform to the intermediate frequency signal. The display unit then displays on-screen the frequency spectrum generated by the data processor.

The secondary signal may also contain a signal expressing a frequency spectrum generated by applying a Fourier transform to the intermediate frequency signal, with the apparatus further including a data processor configured to statistically analyze the frequency spectrum contained in the secondary signal. The display unit then displays on-screen the data obtained as a result of the analysis by the data processor.

The secondary signal acquirer may also acquire the secondary signal from among the signals output to the predetermined signal line by acquiring the signal whose attached header contains the ID code corresponding to the secondary signal.

A signal processing method in accordance with another embodiment of the present invention includes the steps of: acquiring synchronization with the spreading code of an intermediate frequency signal that is obtained by converting the frequency of a received signal into a predetermined intermediate frequency, wherein the received signal is received from a satellite in a global positioning system; demodulating a message contained in the synchronized intermediate frequency signal; outputting a primary signal to a predetermined signal line, wherein the primary signal expresses the results of measuring at least one from among the position, velocity, and time of the apparatus as measured on the basis of the demodulated message; and attaching a predetermined header to a secondary signal and outputting the result to the predetermined signal line, wherein the secondary signal contains at least the intermediate frequency signal, or a signal generated from the intermediate frequency signal.

A program in accordance with another embodiment of the present invention causes a computer that controls a signal processing apparatus to function as: a synchronizer configured to acquire synchronization with the spreading code of an intermediate frequency signal that is obtained by converting the frequency of a received signal into a predetermined intermediate frequency, wherein the received signal is received from a satellite in a global positioning system; a demodulator configured to demodulate a message contained in the intermediate frequency signal synchronized by the synchronizer; a measuring unit configured to output a primary signal to a predetermined signal line, wherein the primary signal expresses the results of measuring at least one from among the position, velocity, and time of the apparatus as measured on the basis of the message that was demodulated by the demodulator; and a secondary signal output unit configured to attach a predetermined header to a secondary signal and output the result to the predetermined signal line, wherein the secondary signal contains at least the intermediate frequency signal, or a signal generated from the intermediate frequency signal.

A data display method in accordance with another embodiment of the present invention is executed using an information processing apparatus able to display data on a given screen, the method including the steps of: acquiring a primary signal from a predetermined signal line, wherein the primary signal expresses at least one from among the position, velocity, and time of the apparatus as measured on the basis of an intermediate frequency signal obtained by converting the frequency of a received signal into an intermediate frequency, and wherein the received signal is received from a satellite in a global positioning system; acquiring a secondary signal from the predetermined signal line, wherein the secondary signal contains at least the intermediate frequency signal, or a signal generated from the intermediate frequency signal; and displaying, on the given screen, data corresponding to the primary signal, as well as data corresponding to the secondary signal.

A program in accordance with another embodiment of the present invention is executed by a computer that controls an information processing apparatus able to display data on a given screen. The program causes the computer to function as: a primary signal acquirer configured to acquire a primary signal from a predetermined signal line, wherein the primary signal expresses at least one from among the position, velocity, and time of the apparatus as measured on the basis of an intermediate frequency signal obtained by converting the frequency of a received signal into an intermediate frequency, and wherein the received signal is received from a satellite in a global positioning system; a secondary signal acquirer configured to acquire a secondary signal from the predetermined signal line, wherein the secondary signal contains at least the intermediate frequency signal, or a signal generated from the intermediate frequency signal; and a display unit able to display, on the given screen, data corresponding to the primary signal acquired by the primary signal acquirer, as well as data corresponding to the secondary signal acquired by the secondary signal acquirer.

As described above, according to a signal processing apparatus, information processing apparatus, signal processing method, data display method, and program in accordance with embodiments of the present invention, it becomes possible to efficiently observe and analyze noise appearing in signals passing through a GPS module.

BRIEF DESCRIPTION OF THE DRAWINGS

FIG. 6 is a diagram for explaining the spectrum of an IF signal after AD conversion;

FIG. 10 is a diagram for explaining the processing patterns of a secondary signal output unit in accordance with an embodiment of the present invention;

DESCRIPTION OF THE PREFERRED EMBODIMENTS

Hereinafter, preferred embodiments of the present invention will be described in detail and with reference to the accompanying drawings. In the specification and drawings herein, component elements having essentially the same functional configurations are given identical reference numbers, and repeated description thereof is omitted.

The preferred embodiments will be described in the following order.

1. Description of GPS module related to the present invention
2. Description of embodiment
  2-1. System overview
  2-2. Exemplary configuration of GPS module
  2-3. Exemplary secondary signal format
  2-4. Exemplary configuration of display module
3. Description of modification 1. Description of GPS Module Related to the Present Invention FIG. 1 is a block diagram illustrating the hardware configuration of a GPS module 10 related to the present invention.

Figure 1:
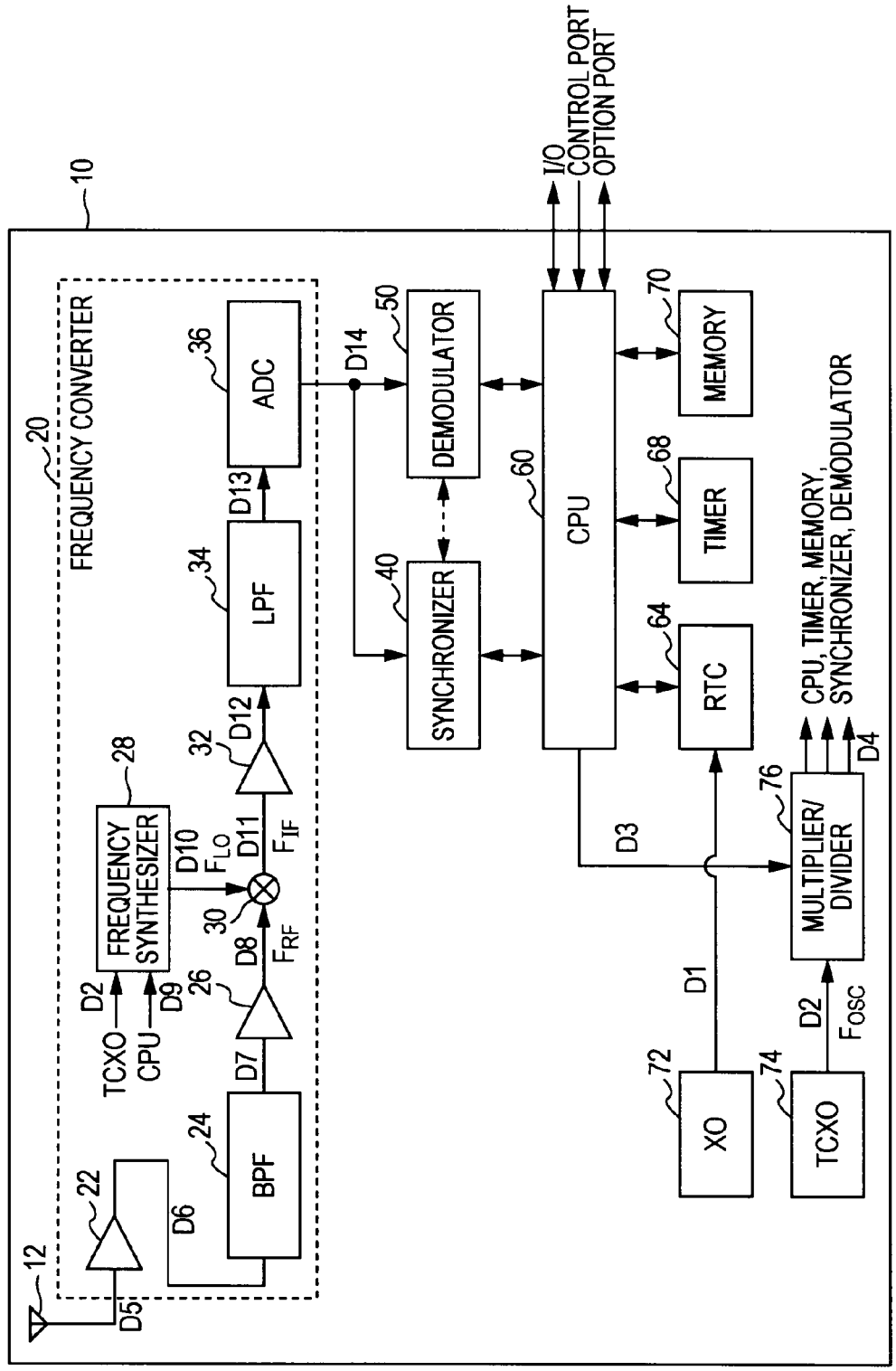
FIG. 1 is a block diagram illustrating the configuration of a GPS module related to the present invention.

With reference to FIG. 1, the GPS module 10 is provided with an antenna 12, a frequency converter 20, a synchronizer 40, a demodulator 50, a central processing unit (CPU) 60, a realtime clock (RTC) 64, a timer 68, memory 70, a crystal oscillator (XO) 72, a temperature-compensated crystal oscillator (TCXO) 74, and a multiplier/divider 76.

Oscillation of the XO 72 produces a signal D1 having a predetermined frequency (such as approximately 32.768 kHz, for example). The produced signal D1 is supplied to the RTC 64. Oscillation of the TCXO 74 produces a signal D2 having a frequency different from that of the XO 72 (such as approximately 16.368 MHz, for example). The produced signal D2 is supplied to both the multiplier/divider 76 and a frequency synthesizer 28.

On the basis of instructions from the CPU 60, the multiplier/divider 76 multiplies, divides, or both multiplies and divides the signal D2 supplied from the TCXO 74. Subsequently, the multiplier/divider 76 supplies the resulting signal D4 to the frequency synthesizer 28 of the frequency converter 20, an ADC 36, the CPU 60, the timer 68, the memory 70, the synchronizer 40, and the demodulator 50.

The antenna 12 receives a wireless signal containing a navigation message or other information that was transmitted from a Global Positioning System (GPS) satellite. (For example, the wireless signal may be an RF spread spectrum signal on a 1575.42 MHz carrier frequency.) The antenna 12 converts the received wireless signal to an electrical signal D5, and then supplies the result to the frequency converter 20.

The frequency converter 20 is provided with a low noise amplifier (LNA) 22, a band pass filter 24, an amplifier 26, the frequency synthesizer 28, a multiplier 30, an amplifier 32, a low pass filter (LPF) 34, and an analog-to-digital converter (ADC) 36. As described hereinafter, in order to simplify digital signal processing, the frequency converter 20 takes the signal D5 having the high frequency of 1575.42 MHz that was received by the antenna 12, and downconverts to a signal D14 having a frequency of approximately 1.023 MHz, for example.

The LNA 22 amplifies the signal D5 supplied from the antenna 12, and supplies the result to the BPF 24. The BPF 24 is made up of a surface acoustic wave (SAW) filter, and extracts only a specific frequency component from among the frequency components in the amplified signal D6 from the LNA 22. The extracted frequency components are then supplied to the amplifier 26. The amplifier 26 amplifies the signal D7 containing the frequency component that was extracted by the BPF 24 (i.e., the frequency $F_{RF}$), and supplies the result to the multiplier 30.

On the basis of instructions D9 from the CPU 60, the frequency synthesizer 28 uses the signal D2 supplied from the TCXO 74 to generate a signal D10 having a frequency $F_{LO}$. Subsequently, the frequency synthesizer 28 supplies the generated signal D10 having the frequency $F_{LO}$ to the multiplier 30.

The multiplier 30 multiplies the signal D8, having the frequency $F_{RF}$ and supplied from the amplifier 26, by the signal D10, having the frequency $F_{LO}$ and supplied from the frequency synthesizer 28. In other words, the multiplier 30 downconverts the high-frequency signal to an intermediate frequency (IF) signal D11 (such as an intermediate frequency of approximately 1.023 MHz, for example).

The amplifier 32 amplifies the downconverted IF signal D11 from the multiplier 30, and supplies the result to the LPF 34.

The LPF 34 extracts the low-frequency component from among the frequency components of the amplified IF signal D12 from the multiplier 30, and supplies a signal D13 having the extracted low-frequency component to the ADC 36. Herein, FIG. 1 shows the LPF 34 being placed between the amplifier 32 and the ADC 36 by way of example, but a BPF may also be placed between the amplifier 32 and the ADC 36.

The ADC 36 converts the analog IF signal D13 supplied from the LPF 34 into a digital format by means of sampling, and then supplies the converted digital IF signal D14 to the synchronizer 40 and the demodulator 50 one bit at a time.

On the basis of control by the CPU 60, the synchronizer 40 uses the signal D3 supplied from the multiplier/divider 76 to acquire sync with pseudo-random noise (PRN) in the IF signal D14 supplied from the ADC 36. Additionally, the synchronizer 40 detects the carrier frequency of the IF signal D14. Subsequently, the synchronizer 40 supplies information such as the phase of the PRN and the carrier frequency of the IF signal D14 to the demodulator 50 and the CPU 60.

On the basis of control by the CPU 60, the demodulator 50 uses the signal D3 supplied from the multiplier/divider 76 to maintain sync with the PRN and the carrier of the IF signal D14 supplied from the ADC 36. More specifically, the demodulator 50 operates by taking the PRN phase and carrier frequency of the IF signal D14 that were supplied from the synchronizer 40 as initial values. The demodulator 50 then demodulates the navigation message contained in the IF signal D14 supplied from the ADC 36, and supplies the demodulated navigation message, as well as both the high-precision PRN phase and carrier frequency, to the CPU 60.

On the basis of the navigation message, PRN phase, and carrier frequency supplied from the demodulator 50, the CPU 60 computes the positions and velocities of respective GPS satellites, and calculates the position of the GPS module 10. The CPU 60 may also correct the time information of the RTC 64 on the basis of the navigation message. The CPU 60 may also be connected to control, I/O, option, and similar ports, and may execute various other types of control processes.

Using the signal D1 having a predetermined frequency and supplied from the XO 72, the RTC 64 measures the time. The time as measured by the RTC 64 may be corrected by the CPU 60 as appropriate.

Using the signal D4 supplied from the multiplier/divider 76, the timer 68 counts time. Such a timer 68 is referenced in particular situations, such as when determining the start timing for various control processes executed by the CPU 60. For example, the CPU 60 may reference the timer 68 when determining the timing for initiating a PRN generator in the demodulator 50 on the basis of the PRN phase acquired by the synchronizer 40.

The memory 70 may be realized by means of random access memory (RAM) and read-only memory (ROM). The memory 70 functions as work space for the CPU 60, as a program storage unit, and as a navigation message storage unit, for example. In the memory 70, RAM is used as a work area when the CPU 60 or similar component executes various processes. Additionally, RAM may also be used in order to buffer various input data, to store the ephemeris and almanac data included in the GPS satellite orbital information obtained by the demodulator 50, as well to store both intermediate data generated partway during computational processes and computational results data. Meanwhile, in the memory 70, ROM is used as a means to store various programs, static data, and similar information. Furthermore, in some cases non-volatile memory may be used in the memory 70 as a means to store information while the GPS module 10 is powered off. Such information may include the ephemeris and almanac data included in the GPS satellite information, position information from positioning results, and TCXO 74 error values.

Herein, the respective blocks of the GPS module 10 shown in FIG. 1 (excluding the XO 72, TCXO 74, antenna 12, and BPF 24) can also be mounted on an integrated circuit made up of a single chip.

Figure 2:
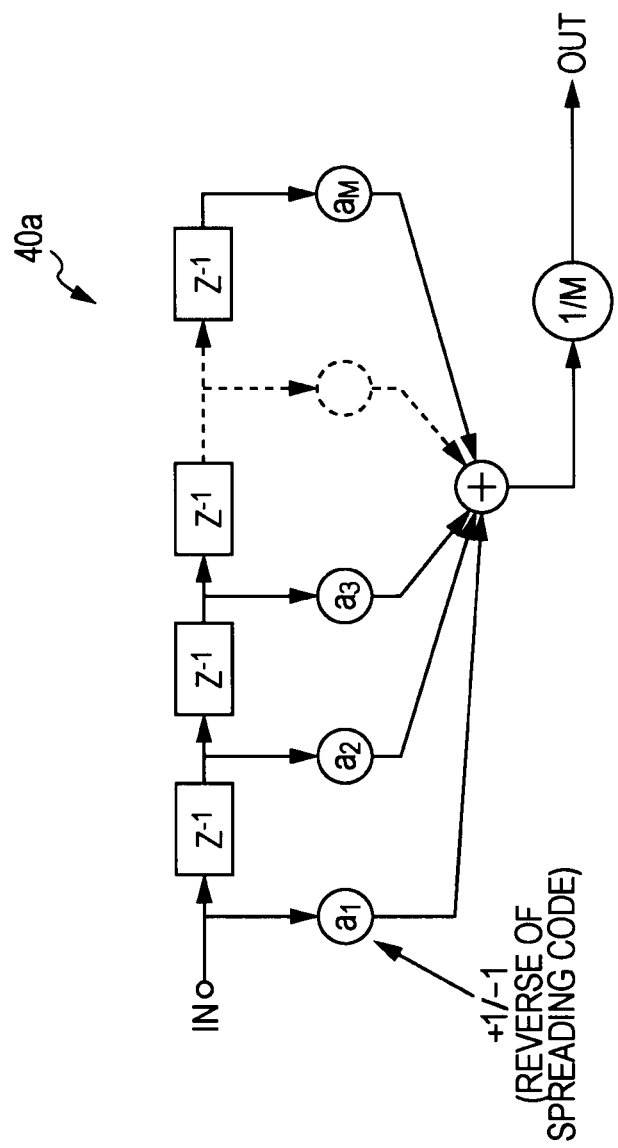
FIG. 2 is a block diagram illustrating an exemplary detailed configuration of the synchronizer shown in FIG. 1.

In order to quickly achieve sync acquisition of the spreading code, the synchronizer 40 herein may use a matched filter, for example. More specifically, the synchronizer 40 may also use the transversal filter 40a shown by way of example in FIG. 2 as a matched filter. Alternatively, the synchronizer 40 may also use the digital matched filter 40b that utilizes the fast Fourier transform (FFT) shown by way of example in FIG. 3 as a matched filter.

Figure 3:
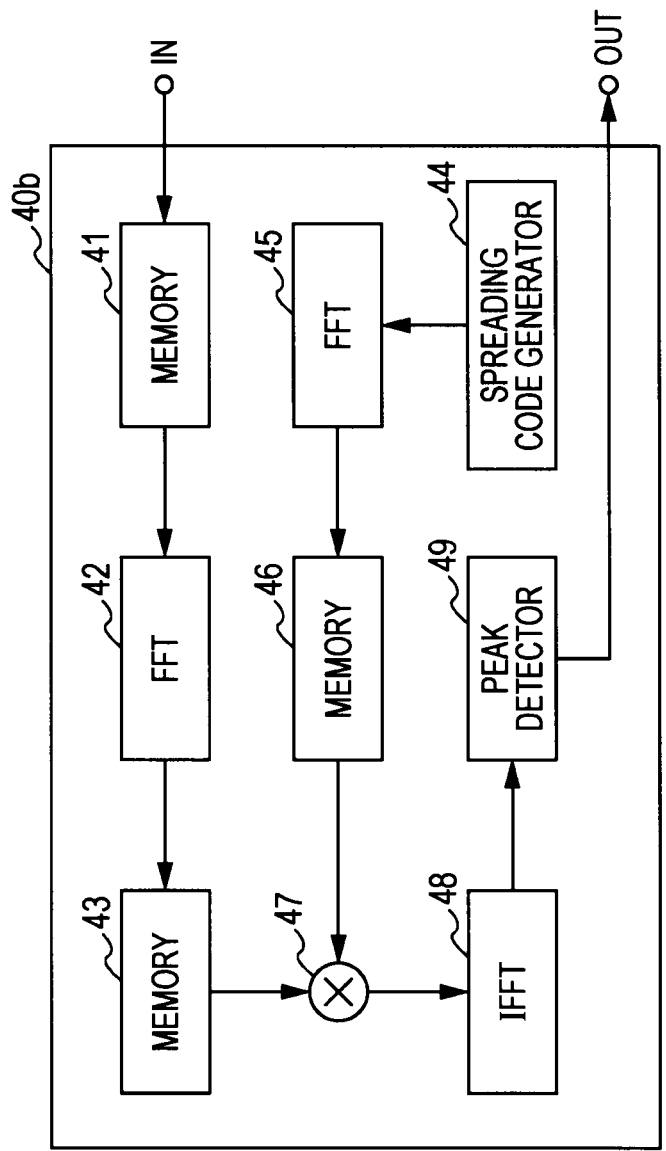
FIG. 3 is a block diagram illustrating another exemplary detailed configuration of the synchronizer shown in FIG. 1.

For example, referring to FIG. 3, the digital matched filter 40b includes memory 41, an FFT unit 42, memory 43, a spreading code generator 44, an FFT unit 45, memory 46, a multiplier 47, an inverse fast Fourier transform (IFFT) unit 48, and a peak detector 49.

The memory 41 buffers the sampled IF signal from the ADC 36 of the frequency converter 20. The FFT unit 42 reads out the IF signal buffered by the memory 41, and applies the fast Fourier transform thereto. The memory 43 buffers the frequency-domain signal obtained as a result of converting the time-domain IF signal using the fast Fourier transform in the FFT unit 42.

Meanwhile, the spreading code generator 44 generates spreading code identical to the spreading code in the RF signal from the GPS satellite. The FFT unit 45 applies the fast Fourier transform to the spreading code generated by the spreading code generator 44. The memory 46 buffers the frequency-domain signal obtained as a result of converting the time-domain spreading code using the fast Fourier transform in the FFT unit 45.

The multiplier 47 multiplies the frequency-domain signal buffered in the memory 43 by the frequency-domain spreading code buffered in the memory 46. The IFFT unit 48 applies the inverse fast Fourier transform to the multiplied frequency-domain signal output from the multiplier 47. In so doing, a correlation signal in the time domain is acquired between the spreading code in the RF signal from the GPS satellite, and the spreading code generated by the spreading code generator 44. Subsequently, the peak detector 49 detects peaks in the correlation signal output from the IFFT unit 48.

Such a digital matched filter 40b may also be realized in software that uses a digital signal processor (DSP) to execute the processing of the FFT units 42 and 45, the spreading code generator 44, the multiplier 47, the IFFT unit 48, and the peak detector 49, respectively.

Figure 4:
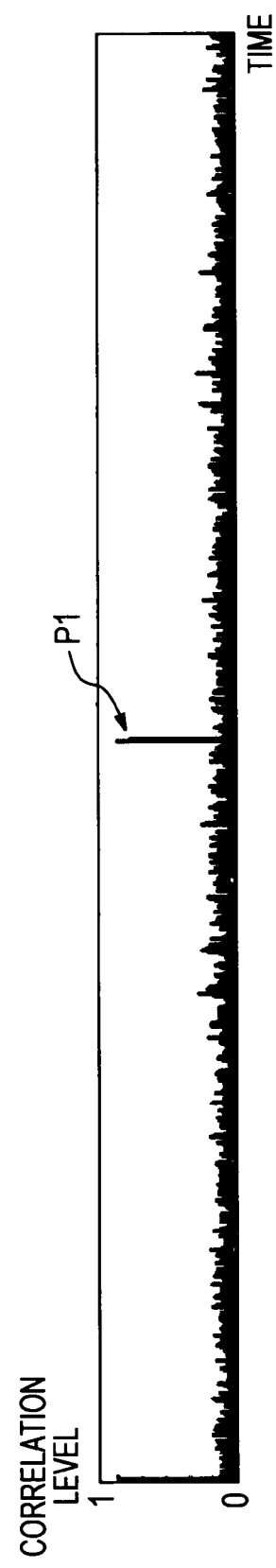
FIG. 4 is an explanatory diagram illustrating an exemplary correlation signal peak output from a digital matched filter.

FIG. 4 is an explanatory diagram illustrating an exemplary correlation signal peak acquired by the digital matched filter 40a or 40b described above. Referring to FIG. 4, a peak P1 where the correlation level spikes is detected in a single period of the output waveform of the correlation signal. The position of such a peak P1 on the time axis corresponds to the beginning of the spreading code. In other words, by detecting peaks like the above peak P1, the synchronizer 40 is able to detect synchronization with incoming signals received from GPS satellites (i.e., detect the phase of the spreading code).

Figure 5:
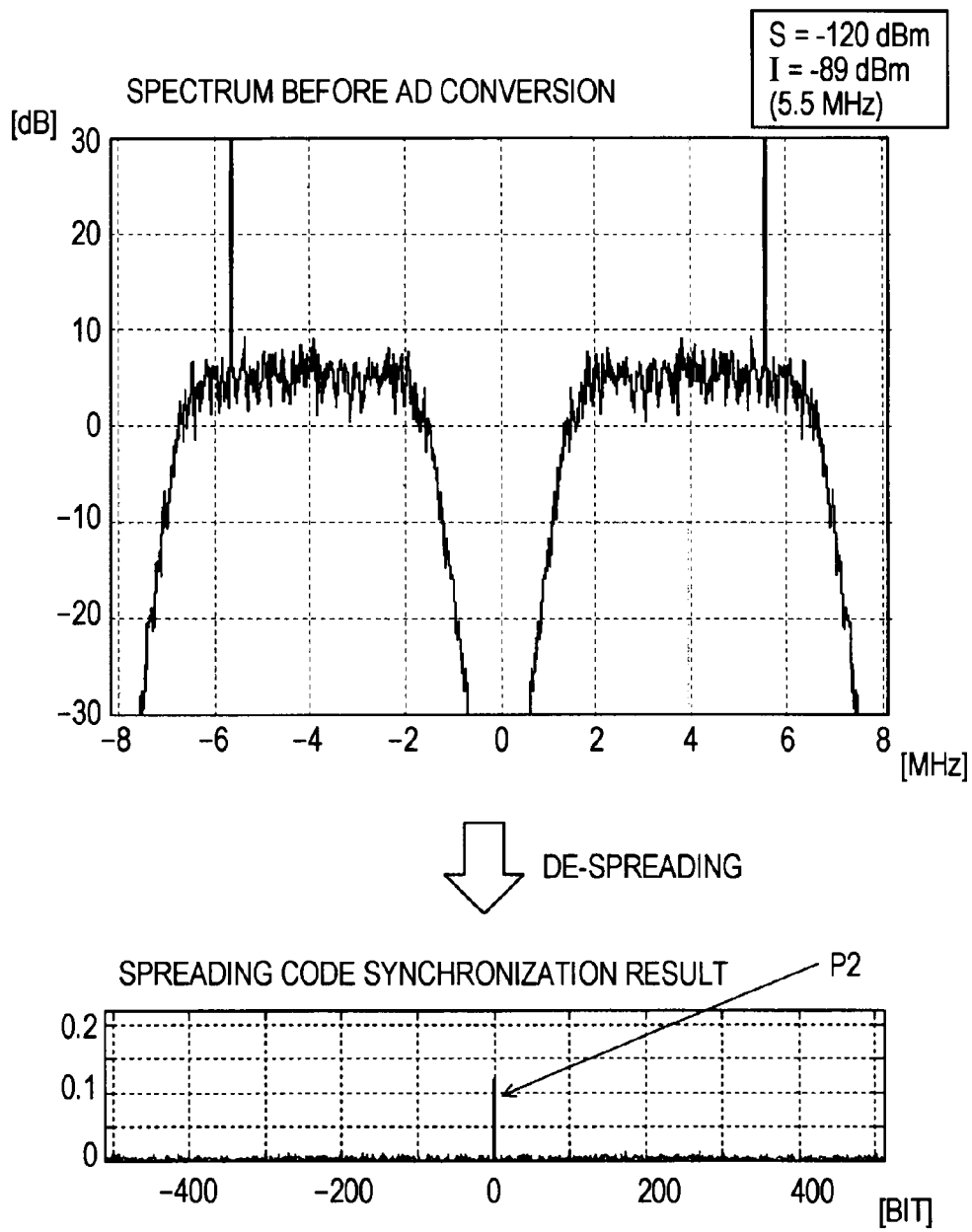
FIG. 5 is a diagram for explaining the spectrum of an IF signal before AD conversion.

FIGS. 5 and 6 are diagrams for explaining the spectra of an IF signal before and after AD conversion, in the case where external noise is introduced into the GPS module 10.

The upper part of FIG. 5 illustrates the spectrum of an IF signal before AD conversion by the ADC 36, in the case where strong, mono-frequency external noise is introduced into the GPS module 10. The external noise may be caused by the clock or similar component of a personal computer (PC), for example. Herein, the spectrum is shown such that the sign of the frequency is inverted about the center of the frequency (i.e., horizontal) axis. In FIG. 5, strong, spiking noise having a frequency slightly less than 6 MHz is observed. This noise is the mono-frequency external noise caused by a clock or similar component of a PC. Additionally, in the frequency from approximately 1 MHz to approximately 7 MHz, strong, uniform noise is observed. This noise corresponds to the thermal noise after passing through the BPF. Meanwhile, the lower part of FIG. 5 illustrates the results of using a predetermined spreading code to de-spread an IF signal having a spectrum like that shown in the upper part of FIG. 5. In the lower part of FIG. 5, a peak P2 is detected in the central portion of the phase range of the 1023-bit spreading code. This peak P2 expresses the phase of the GPS signal acquired by de-spreading. Consequently, FIG. 5 demonstrates that if the IF signal has not yet been AD-converted, then GPS signal sync can be acquired without saturating the signal.

In contrast, the upper part of FIG. 6 illustrates the spectrum of an IF signal after AD conversion by the ADC 36, in the case where the strong, mono-frequency external noise described above is introduced into the GPS module 10. Herein, the resolution of the ADC 36 is taken to be 2 bits. In FIG. 6, spiking noise is observed at a plurality of frequencies, due to the output signal from the ADC 36 being saturated by external noise. Furthermore, in the de-spreading results shown in lower part of FIG. 6, the GPS signal is suppressed, and as a result, the phase of the GPS signal does not appear as a peak, and thus sync is not acquired for the GPS signal. In other words, FIG. 6 demonstrates that even if the IF signal is not saturated while in analog and the process gain of the de-spreading process is sufficiently higher than the inverse of S/(N+I), the signal might still be saturated in digital after AD conversion with 2-bit resolution, and the GPS signal might not be detected.

In conditions where such external noise is present, the inherent performance of the GPS module is not expressed. Consequently, when designing, manufacturing, or testing electronic devices provided with GPS modules, there is demand to observe and develop countermeasures for the types of effects exerted on the GPS module by noise produced by the electronic device. However, due to the reasons given earlier, directly observation of external noise introduced into the GPS module is not easy. Given the above, the configuration in accordance with an embodiment of the present invention to be described in the following section enables observation and analysis of external noise introduced into a GPS module, without involving additional wiring or specialized measuring equipment.

2. Description of Embodiment 2-1. System Overview

Figure 7:
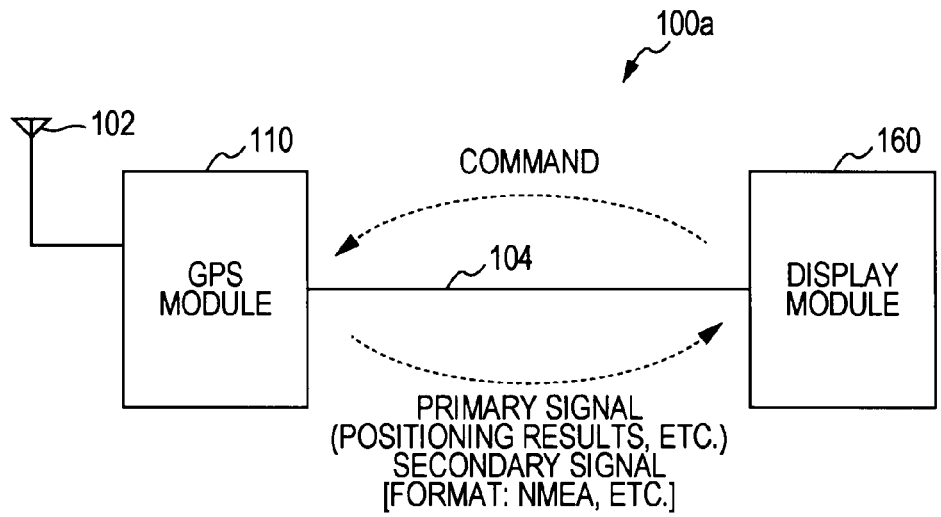
FIG. 7 is a schematic diagram illustrating an exemplary configuration of a GPS system in accordance with an embodiment of the present invention.

FIG. 7 illustrates an exemplary schematic configuration of a GPS system in accordance with an embodiment of the present invention. In FIG. 7, a GPS system 100a is shown to include an antenna 102, a signal line 104, a GPS module 110, and a display module 160.

Similarly to the antenna 12 shown in FIG. 1, the antenna 102 receives a wireless signal containing a navigation message or other information that was transmitted from a GPS satellite, and supplies the received signal to the GPS module 110.

The signal line 104 connects the GPS module 110 to the display module 160. Typically, the signal line 104 is used for serial transmission of signals between the GPS module 110 and the display module 160.

In response to commands input from the display module 160 via the signal line 104, the GPS module 110 conducts various processes, such as converting the frequency of an incoming signal supplied from the antenna 102, acquiring sync with an IF signal, demodulating a navigation message, and executing positioning processing, for example. Subsequently, the GPS module 110 outputs to the signal line 104 a primary signal expressing information such as the results of the positioning processing. Additionally, in the present embodiment, the GPS module 110 outputs to the signal line 104 a secondary signal used to observe and analyze noise introduced into the GPS module 110, as further described hereinafter. Herein, the format of the primary signal and secondary signal output by the GPS module 110 may follow a standard specification such as National Marine Electronics Association (NMEA) 0183, or an independently-defined format.

Via the signal line 104, the display module 160 outputs to the GPS module 110 commands containing various instructions, such as starting the positioning process, and starting or resetting the secondary signal output process, for example. In addition, via the signal line 104, the display module 160 acquires the primary signal and secondary signal described earlier that are output from the GPS module 110. Subsequently, the display module 160 displays information on a given screen provided in the display module 160. The information may be, for example, the results of the positioning process as expressed by the primary signal, the content of the secondary signal, or similar information.

Figure 8:
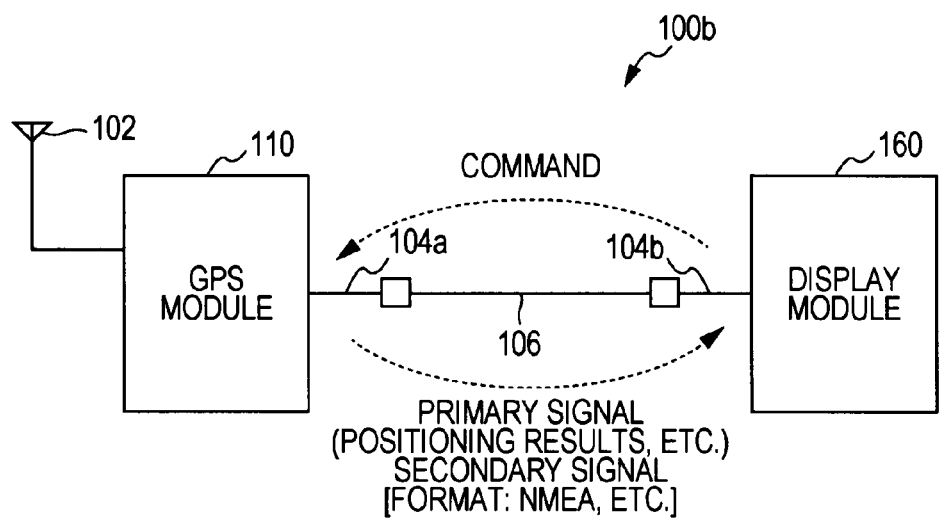
FIG. 8 is a schematic diagram illustrating another exemplary configuration of a GPS system in accordance with an embodiment of the present invention.

FIG. 8 illustrates another exemplary schematic configuration of a GPS system in accordance with an embodiment of the present invention. In FIG. 8, a GPS system 100b is shown to include an antenna 102, signal lines 104a and 104b, a connecting line 106, a GPS module 110, and a display module 160.

In the GPS system 100b, the signal line between the GPS module 110 and the display module 160 is split into the signal lines 104a and 104b, with the connecting line 106 connecting the two signal lines. The connecting line 106 may be, for example, a cable based on a serial communication standard such as RS-232C, USB, or Bluetooth™. In this case, conversion ports adhering to one of the above serial communication standards are provided between the connecting line 106 and the respective signal lines 104a and 104b.

The configuration of the GPS system 100a shown in FIG. 7 is applicable to an electronic device wherein the GPS module 110 is built onto the circuit board in advance, such as a mobile phone handset, car navigation equipment, or digital still camera, for example. In this case, the display module 160 is implemented as a host module of the electronic device. In contrast, the configuration of the GPS system 100b shown in FIG. 8 is applicable to an electronic device wherein the GPS module 110 is externally attached or linked, for example. In this case, the display module 160 is implemented as the principal unit of the electronic device, such as a mobile personal computer (PC) or personal digital assistant (PDA).

More specific configurations of the GPS module 110 and the display module 160 described above will now be described.

2-2. Exemplary Configuration of GPS Module

Figure 9:
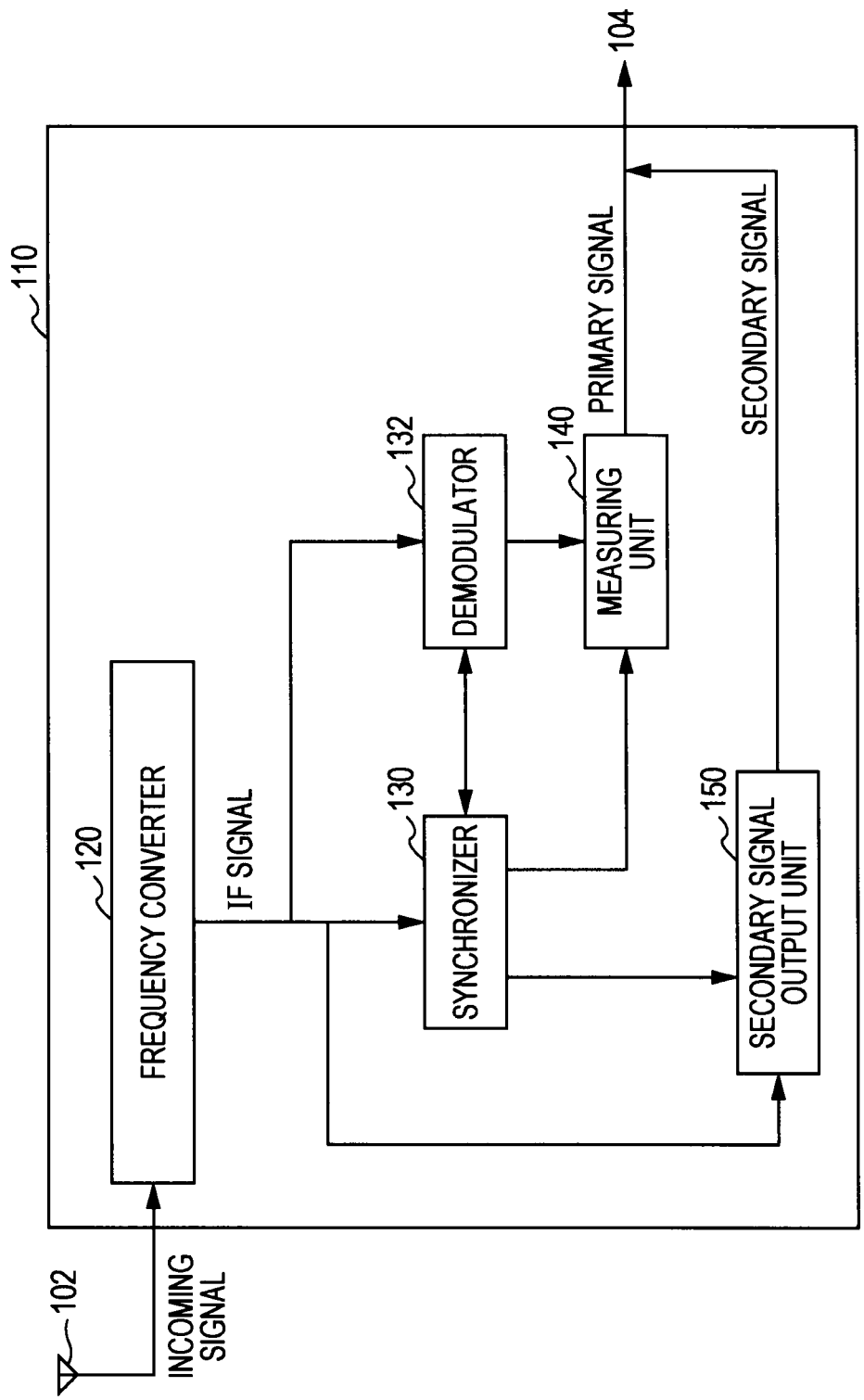
FIG. 9 is a block diagram illustrating an exemplary logical configuration of a GPS module in accordance with an embodiment of the present invention.

FIG. 9 is a block diagram illustrating in detail the logical configuration of a GPS module 110 in accordance with the present embodiment. In FIG. 9, the GPS module 110 is primarily provided with a frequency converter 120, a synchronizer 130, a demodulator 132, a measuring unit 140, and a secondary signal output unit 150.

Similarly to the frequency converter 20 shown in FIG. 1, the frequency converter 120 amplifies a signal received from a GPS satellite via the antenna 102, and generates an IF signal by converting the frequency of the incoming signal to a predetermined intermediate frequency. In addition, the frequency converter 120 uses sampling to convert the analog IF signal into a digital signal. Subsequently, the frequency converter 120 supplies the converted digital IF signal to the synchronizer 130, demodulator 132, and secondary signal output unit 150.

Similarly to the synchronizer 40 shown in FIG. 1, the synchronizer 130 using a predetermined spreading code for sync acquisition with the IF signal supplied from the frequency converter 120. In addition, the synchronizer 130 detects the carrier frequency of the IF signal. Subsequently, the synchronizer 130 supplies the acquired phase of the spreading code and the carrier frequency of the IF signal to the demodulator 132 and the measuring unit 140. The synchronizer 130 may also be configured to use the transversal filter 40a shown by way of example in FIG. 2. Alternatively, the synchronizer 130 may be configured to use the digital matched filter 40b shown by way of example in FIG. 3. Furthermore, the synchronizer 130 may also output to the secondary signal output unit 150 the frequency spectrum obtained by applying a fast Fourier transform to the IF signal, as described later.

Similarly to the demodulator 50 shown in FIG. 1, the demodulator 132 uses the spreading code phase and carrier frequency input from the synchronizer 130 as a basis for demodulating the navigation message contained in the IF signal and detecting the high-precision PRN phase and carrier frequency. Subsequently, the demodulator 132 supplies the demodulated navigation message, high-precision PRN phase, and carrier frequency to the measuring unit 140.

On the basis of the navigation message, PRN phase, and carrier frequency supplied from the demodulator 132, the measuring unit 140 uses the CPU 60 shown in FIG. 1 to compute the positions and velocities of respective GPS satellites, and measures at least one from among the position, velocity, and time of the GPS module 110. Subsequently, the measuring unit 140 outputs a primary signal expressing the measurement results to the signal line 104.

The secondary signal output unit 150 attaches a predetermined header to a secondary signal, and outputs the secondary signal to the signal line 104. The secondary signal herein contains at least the IF signal supplied from the frequency converter 120, or a signal generated as a result of processing the IF signal in a given way.

FIG. 10 is a diagram for explaining processing patterns in the secondary signal output unit 150. In FIG. 10, five processing patterns from Pattern 1 to Pattern 5 executed by the secondary signal output unit 150 are shown by way of example. Additionally, for each processing pattern, there is shown the supplier of the input signal to the secondary signal output unit 150, the input signal type, the type of processing executed, and the output signal type.

First, in the case of Pattern 1, an IF signal is supplied to the secondary signal output unit 150 from the frequency converter 120. Once the IF signal is supplied, the secondary signal output unit 150 extracts a predetermined, finite-length signal sequence from the continuous IF signal. Next, the secondary signal output unit 150 generates a secondary signal by attaching a header to the finite-length signal sequence of the IF signal, wherein the header contains an ID code indicating that the signal type is an IF signal. Besides the ID code, the header attached to the secondary signal may also contain arbitrary information such as the data length, for example. Subsequently, the secondary signal output unit 150 outputs the generated secondary signal to the signal line 104.

In the case of Pattern 2, an IF signal is supplied to the secondary signal output unit 150 from the frequency converter 120, similarly to Pattern 1. Once the IF signal is supplied, the secondary signal output unit 150 applies a fast Fourier transform to a finite-length signal sequence extracted from the continuous IF signal. Next, the secondary signal output unit 150 generates a secondary signal by attaching a header to the frequency spectrum obtained as a result of the fast Fourier transform, wherein the header contains an ID code indicating that the signal type is a frequency spectrum for an IF signal. Subsequently, the secondary signal output unit 150 outputs the generated secondary signal to the signal line 104.

In the case of Pattern 3, an IF signal is supplied to the secondary signal output unit 150 from the frequency converter 120, similarly to Patterns 1 and 2. Once the IF signal is supplied, the secondary signal output unit 150 first applies a fast Fourier transform to a finite-length signal sequence extracted from the continuous IF signal. Next, the secondary signal output unit 150 performs statistical analysis on the frequency spectrum obtained as a result of the fast Fourier transform. More specifically, the secondary signal output unit 150 may compute information such as several dominant frequencies expressing high noise levels in the frequency spectrum, the ratio of the measured power versus the power in an ideal state measured in advance, and a time average or distribution of the noise levels. The secondary signal output unit 150 then generates a secondary signal by attaching a header to the statistical data computed by the statistical analysis, wherein the header contains an ID code indicating the data type. Subsequently, the secondary signal output unit 150 outputs the generated secondary signal to the signal line 104.

In the case of Pattern 4, the frequency spectrum of an IF signal is supplied to the secondary signal output unit 150 from the synchronizer 130. The frequency spectrum supplied at this point may be, for example, the frequency spectrum resulting from the FFT being applied to the IF signal by the FFT unit 42 of the digital matched filter 40b, in the case where the synchronizer 130 is configured to use the digital matched filter 40b shown by way of example in FIG. 3. Once the frequency spectrum is supplied, the secondary signal output unit 150 generates a secondary signal by attaching a header to the supplied frequency spectrum, wherein the header contains an ID code indicating that the signal type is a frequency spectrum. Subsequently, the secondary signal output unit 150 outputs the generated secondary signal to the signal line 104.

In the case of Pattern 5, the frequency spectrum of an IF signal is supplied to the secondary signal output unit 150 from the synchronizer 130, similarly to Pattern 4. Once the frequency spectrum is supplied, the secondary signal output unit 150 performs statistical analysis on the supplied frequency spectrum. The statistical analysis processing executed at this point may be similar to that of the above Pattern 3. The secondary signal output unit 150 then generates a secondary signal by attaching a header to the statistical data obtained as a result of the statistical analysis, wherein the header contains an ID code indicating the data type. Subsequently, the secondary signal output unit 150 outputs the generated secondary signal to the signal line 104.

The secondary signal output unit 150 executes processing for one of the above five processing patterns in response to commands input from the display module 160, for example.

Additionally, the secondary signal output unit 150 may also execute processing for a plurality of the five processing patterns, and generate a secondary signal jointly containing the results from each process.

Herein, the signal line to which the secondary signal output unit 150 outputs the secondary signal is the same signal line 104 to which the measuring unit 140 outputs the primary signal. Thus, in order to avoid collision with the primary signal from the measuring unit 140, the secondary signal output unit 150 outputs the secondary signal at a timing when the primary signal is not being output from the measuring unit 140. For example, assume that the frequency spectrum of the IF signal is included in the secondary signal, as in the above Patterns 2 and 4. Assuming that there are 1024 FFT points, and that the bit length for the absolute value of each frequency component is 8 bits, then the data length of the frequency spectrum of the IF signal becomes 8 kb overall. Consequently, if the secondary signal output rate is assumed to be once every several seconds, for example, then it is possible to transfer secondary signals using a signal line shared with the primary signals, even when using the low-speed serial transmission techniques shown in FIGS. 7 and 8.

Herein, the respective processing performed by the secondary signal output unit 150 may also be physically executed using a CPU shared with the measuring unit 140 (such as the CPU 60 of the GPS module 10 shown in FIG. 1, for example). Alternatively, the respective processing performed by the secondary signal output unit 150 may also be physically executed using the DSP used by the synchronizer 130 or the demodulator 132, or additionally provided hardware. In the case of using a general-purpose CPU to execute fast Fourier transforms, statistical analysis, and other processing performed by the secondary signal output unit 150, computations may take more time as compared to execution using a DSP or special-purpose hardware. However, if the above processing is taken to use the CPU sporadically or at low frequency during the idle times between the positioning computations performed by the measuring unit 140, then the secondary signal output unit 150 can output secondary signals without stressing CPU resources.

2-3. Exemplary Secondary Signal Format

Figure 11:
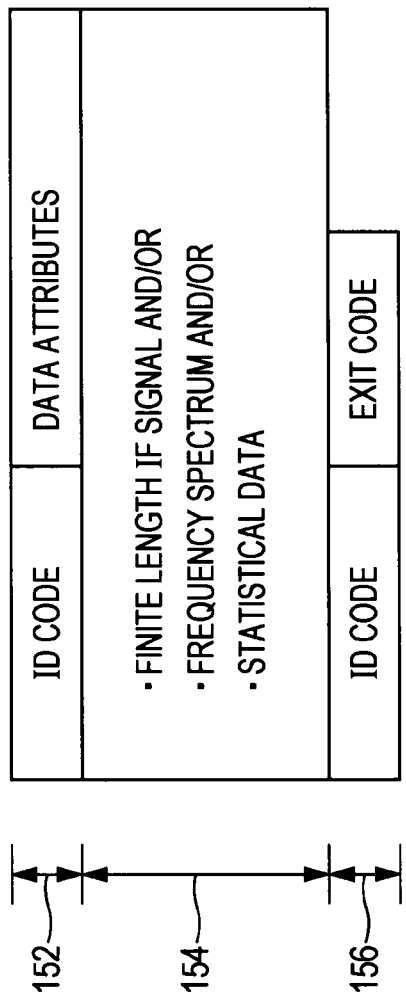
FIG. 11 is an explanatory diagram illustrating an exemplary format of a secondary signal in accordance with an embodiment of the present invention.

FIG. 11 is an explanatory diagram illustrating an exemplary format of a secondary signal output by the secondary signal output unit 150 in accordance with the present embodiment.

In FIG. 11, the secondary signal format includes a header 152, a data field 154, and a trailer 156. The header 152 contains the ID code for identifying the type of signal included in the secondary signal, as well as predetermined data attributes. The data attributes correspond to information such as the data length of the entire secondary signal or of the data portion 154, for example. The data field 154 contains the information shown in the output signal column of FIG. 10, such as a finite-length IF signal, the frequency spectrum of the IF signal, and/or statistical data expressing the results of analyzing the frequency spectrum, for example. The trailer 156 may contain the ID code found in the header 152, as well as an exit code indicating the end of the secondary signal. Herein, FIG. 11 shows a two-dimensional format folded at fixed byte intervals, but it should be appreciated that in practice, a secondary signal is normally a one-dimensional bit sequence.

Figure 12:
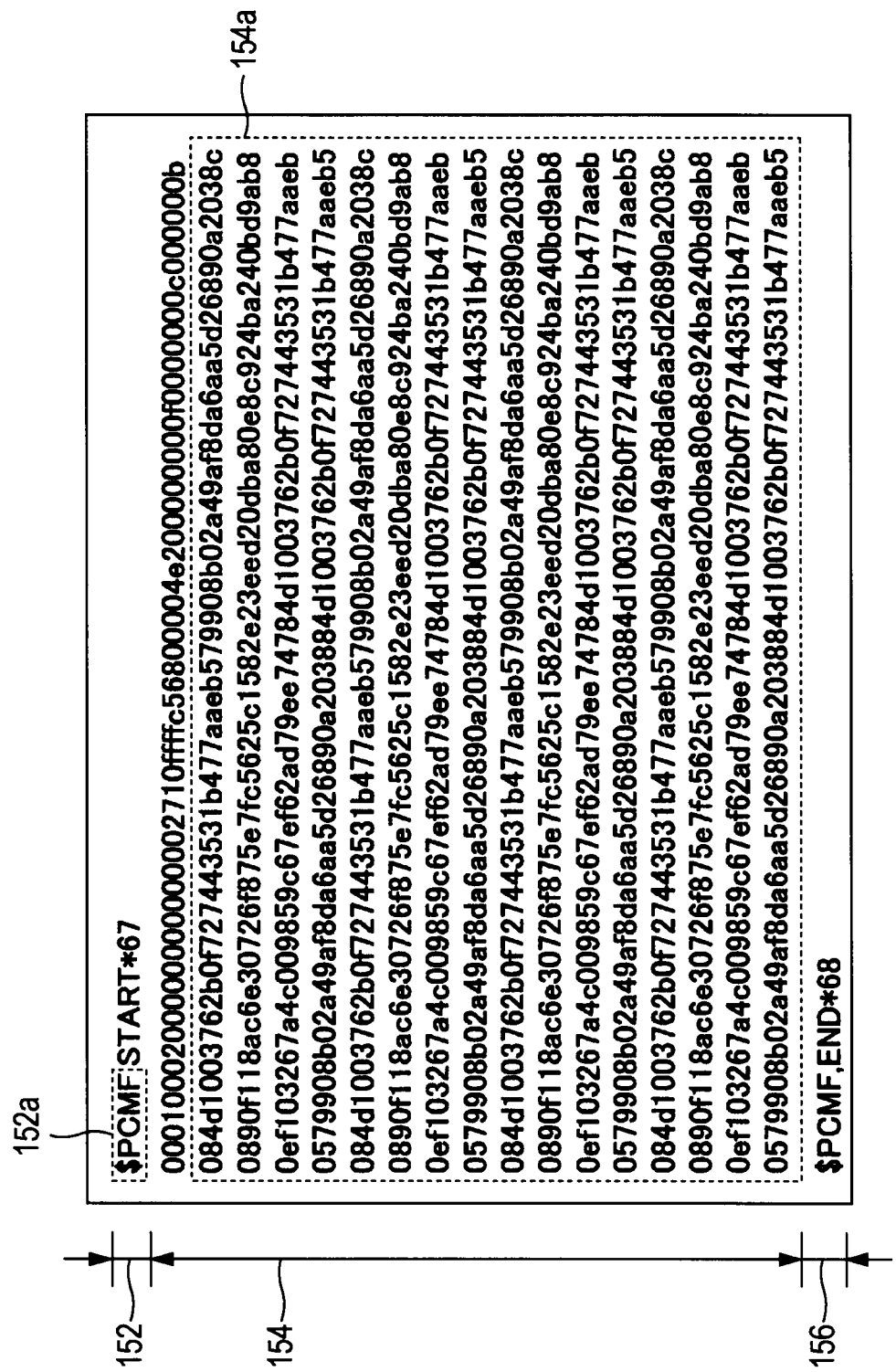
FIG. 12 is an explanatory diagram illustrating exemplary data in a secondary signal in accordance with an embodiment of the present invention.

FIG. 12 is an explanatory diagram illustrating exemplary secondary signal data. By way of example, FIG. 12 shows the case where the frequency spectrum of an IF signal is included in the secondary signal by using the user-defined extension format stipulated in NMEA 0183.

In FIG. 12, the header 152 of the secondary signal contains an ID code 152a, for example. In the text string "$PCMF" of the ID code 152a, the symbol "$" is the format start symbol. The 1-byte "P" following the symbol "$" indicates that the secondary signal is in a user-defined format. The following 2-byte "CM" is a predetermined company code. The following 1-byte "F" indicates that the data field 154 of the current secondary signal contains the frequency spectrum of the IF signal. In other words, by varying the character in the fifth byte of the ID code 152a according to the type of signal included in the secondary signal, for example, an ID code able to identify the signal type can be formed. Meanwhile, NMEA 0183 stipulates that the ID code of a primary signal expressing the position data output from the measuring unit 140 should start with "$GSV", for example. Consequently, the display module 160 to be hereinafter described that receives the secondary signal is able to distinguish between the primary signal and the secondary signal by referencing such ID codes.

The frequency spectrum 154a of the IF signal starts on the second line of the data field 154 of the secondary signal shown in FIG. 12. Herein, the frequency spectrum 154a is a hexadecimal image with 16 points per line and 16 lines, for a total of 256 points. The secondary signal output unit 150 generates such a secondary signal, for example, and outputs the signal to the signal line 104.

Although the secondary signal format is herein described in accordance with NMEA 0183, it should be appreciated that the secondary signal format is not limited to such an example. For example, by using an independently-defined secondary signal format, it is possible to freely include arbitrary bit sequences in the secondary signal and efficiently transmit signals.

2-4. Exemplary Configuration of Display Module

Figure 13:
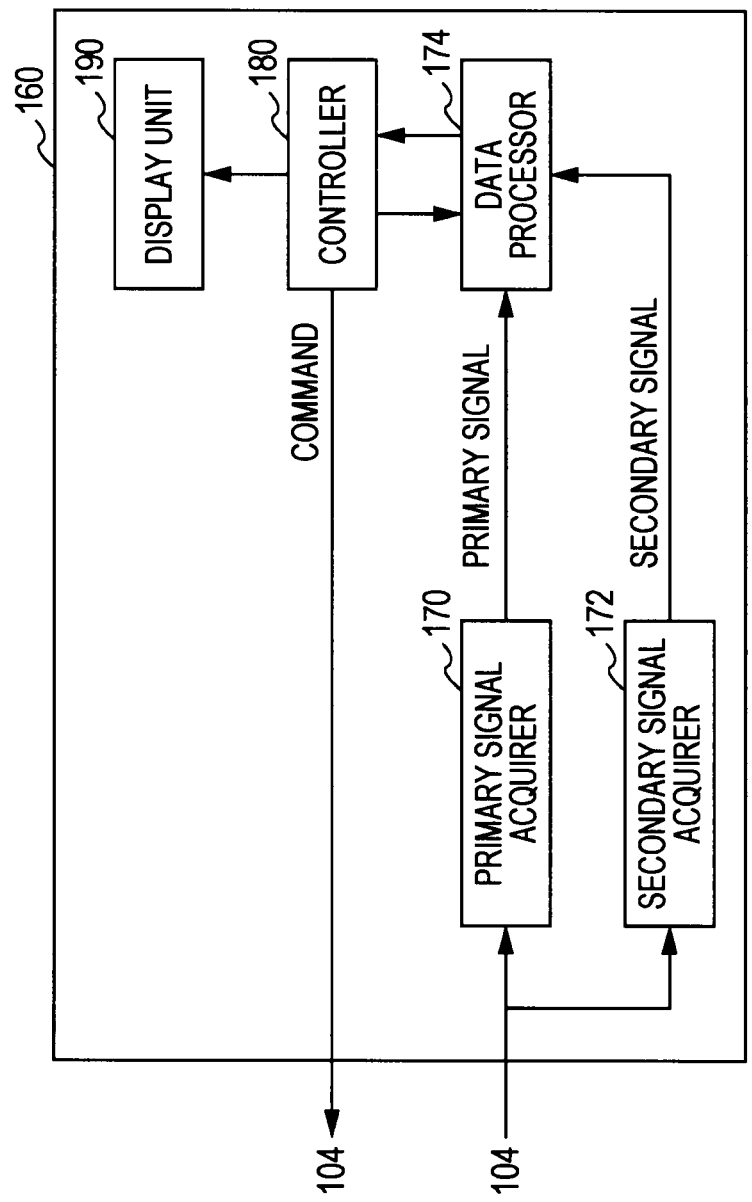
FIG. 13 is a block diagram illustrating an exemplary logical configuration of a display module in accordance with an embodiment of the present invention.

FIG. 13 is a block diagram illustrating in detail the logical configuration of a display module 160 in accordance with the present embodiment. In FIG. 13, the display module 160 is primarily provided with a primary signal acquirer 170, a secondary signal acquirer 172, a data processor 174, a controller 180, and a display unit 190.

From the signal line 104, the primary signal acquirer 170 acquires a primary signal expressing at least one from among the position, velocity, and time that were measured on the basis of the IF signal in the measuring unit 140 of the GPS module 110. More specifically, the primary signal acquirer 170 may acquire the primary signal from among the signals received via the signal line 104 by acquiring the signal starting with the ID code corresponding to the primary signal, for example. The ID code corresponding to the primary signal may be an ID code starting with "$GSV" as stipulated in NMEA 0183 described above, for example. Subsequently, the primary signal acquirer 170 outputs the acquired primary signal to the data processor 174.

From the signal line 104, the secondary signal acquirer 172 acquires the secondary signal generated by the secondary signal output unit 150 of the GPS module 110, the secondary signal herein containing information such as the IF signal, or a frequency spectrum or statistical data generated from the IF signal. More specifically, the secondary signal acquirer 172 may acquire the secondary signal from among the signals received via the signal line 104 by acquiring the signal starting with the ID code corresponding to the secondary signal, for example. The ID code corresponding to the secondary signal may be an ID code like that shown by way of example in FIG. 12, for example. Subsequently, the secondary signal acquirer 172 outputs the acquired secondary signal to the data processor 174.

The data processor 174 extracts data to be displayed on a given screen from the primary signal or secondary signal, for example, and also processes the data as appropriate. Assume, for example, that a finite-length IF signal is included in a secondary signal output from the secondary signal output unit 150 of the GPS module 110 in accordance with Pattern 1 shown in FIG. 10. In this case, the data processor 174 first extracts the finite-length IF signal from the secondary signal. The data processor 174 may then apply the fast Fourier transform to the extracted IF signal to generate a frequency spectrum, and may statistically analyze the frequency spectrum to compute statistical data, as appropriate. Typically, statistical data corresponds to information such as several dominant frequencies expressing high noise levels in the frequency spectrum, the ratio of the measured power versus the power in an ideal state measured in advance, and a time average or distribution of the noise levels.

As another example, assume that the frequency spectrum of the IF signal is included in a secondary signal output from the secondary signal output unit 150 in accordance with Pattern 2 or 4 shown in FIG. 10. In this case, the data processor 174 first extracts the frequency spectrum of the IF signal from the secondary signal. The data processor 174 then statistically analyzes the extracted frequency spectrum to compute statistical data, as appropriate.

As another example, assume that statistical data resulting from statistical analysis performed on the frequency spectrum of the IF signal is included in a secondary signal output from the secondary signal output unit 150 in accordance with Pattern 3 or 5 shown in FIG. 10. In this case, the data processor 174 extracts the statistical data from the secondary signal.

Subsequently, the data processor 174 outputs to the controller 180 the data that was extracted or generated from the primary signal or secondary signal. Herein, if the display module 160 is a PC or similar device having a relatively high-performance CPU, for example, then it is preferable for processes such as fast Fourier transforms and statistical analysis to be conducted by the data processor 174 of the display module 160. In contrast, if the display module 160 is a small, portable device having only a relatively low-performance CPU, then it is preferable for processes such as fast Fourier transforms and statistical analysis to be conducted in the GPS module 110.

The controller 180 sends predetermined commands to the GPS module 110 via the signal line 104, for example, and controls the operation of the GPS module 110. In addition, when data corresponding to a primary signal or secondary signal received from the GPS module 110 is input from the data processor 174, the controller 180 may output the data to the display unit 190 and cause the data to be displayed on a given screen, for example. Besides the above, the controller 180 also controls the general functionality of the display module 160.

The primary signal acquirer 170, secondary signal acquirer 172, data processor 174, and controller 180 described above are also typically realizable as software executed by the host CPU of an electronic device, such as a mobile phone handset, car navigation equipment, or a PC. In such cases, a program constituting the software is stored in advance on a hard disk or in semiconductor memory such as ROM that is accessible by the display module 160.

Figure 14:
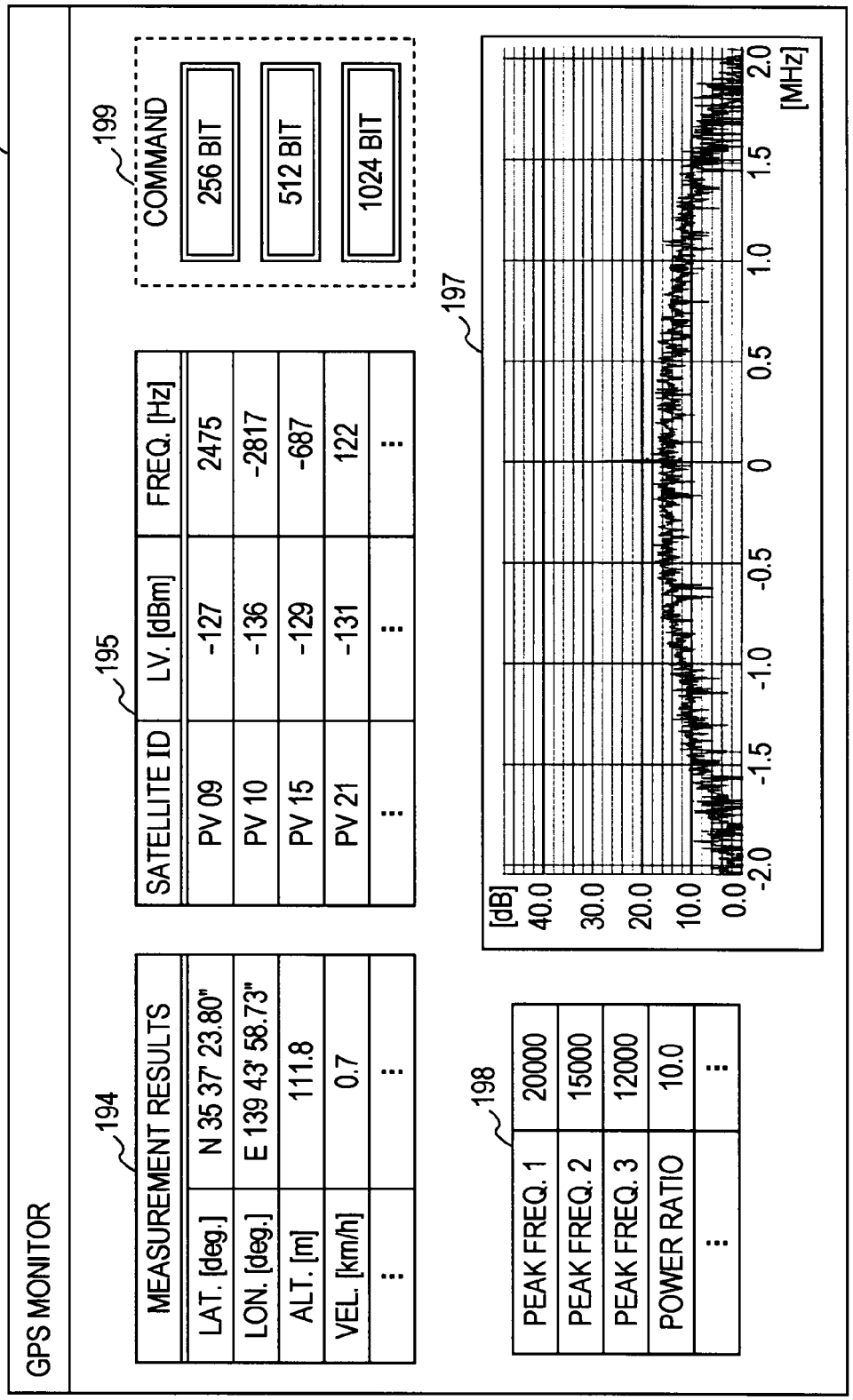
FIG. 14 is an explanatory diagram illustrating exemplary data displayed on a screen in accordance with an embodiment of the present invention.

The display unit 190 displays various data input from the controller 180 on a given screen provided in the electronic device housing the display module 160, for example. FIG. 14 is an explanatory diagram illustrating exemplary data displayed on a screen by the display unit 190.

In FIG. 14, a GPS monitor screen 192 is shown as one example of data that may be displayed by the display unit 190. The GPS monitor screen 192 includes a measurement results display area 194, a satellite data display area 195, a frequency spectrum display area 197, a statistical data display area 198, and a command button area 199.

The measurement results display area 194 is an area displaying data expressed by the primary signal, such as the position and velocity computed as a result of the measuring process conducted by the measuring unit 140 of the GPS module 110. In the example shown in FIG. 14, the measurement results display area 194 shows current latitude (Lat.), longitude (Lon.), altitude (Alt.), and velocity (Vel.) values for the GPS module 110. The satellite data display area 195 displays optional data that can be included in the primary signal. In FIG. 14, the signal strength (Lv.) and Doppler shift frequency (Freq.) of each GPS satellite is displayed according to satellite ID.

The frequency spectrum display area 197 is an area for displaying the frequency spectrum of the IF signal. The frequency spectrum display area 197 may, for example, display a graph of a frequency spectrum extracted from the secondary signal, or a frequency spectrum generated by the data processor 174 of the display module 160 from an IF signal included in the secondary signal. The statistical data display area 198 is an area for displaying statistical data obtained by statistically analyzing the frequency spectrum of the IF signal. In the example shown in FIG. 14, the statistical data display area 198 shows the values of the top three frequencies exhibiting high noise levels in the frequency spectrum (Peak Freq. 1-3), as well as the ratio of the measured power versus the power in the ideal state (Power Ratio). Meanwhile, in the command button area 199, there are arranged command buttons for transmitting commands to the GPS module 110. The commands herein are for changing the number of FFT points (256 bit, 512 bit, 1024 bit) when generating the frequency spectrum.

The display unit 190 thus displays various data corresponding to the primary signal or secondary signal input from the controller 180 on-screen via such a GPS monitor screen 192, for example.

The foregoing thus describes the detailed configuration of a GPS module 110 and a display module 160 in accordance with an embodiment of the present invention, and with reference to FIGS. 9 to 14. According to such a configuration, noise introduced into the GPS module 110 can be directly observed using the screen of the display module 160, which displays the noise spectrum and statistical data for the spectrum. Consequently, it becomes possible to conduct design optimization testing for achieving the inherent performance of the GPS module 110 when provided in an electronic device, the testing being conducted on the basis of direct and quantitative data, and not trial-and-error methods like those of the related art.

Furthermore, the foregoing embodiment does not involve the addition or modification of signal lines between the GPS module 110 and the display module 160, or the connection of additional measuring apparatus. For this reason, work is simplified for design optimization as well as noise analysis and countermeasures testing, and thus design, fabrication, and testing processes can proceed more efficiently.

Moreover, since the secondary signal is simply ignored if the host module of the electronic device does not support the reception of secondary signals, compatibility is preserved with existing electronic devices.

The configuration of the GPS module 110 and display module 160 in accordance with the embodiment described above is not only beneficial for the manufacturers of respective modules or electronic devices, but also for the users of such electronic devices. By using car navigation equipment implementing this configuration of the GPS module 110 and display module 160, the user is able to determine the optimal installation position of the antenna or main unit of the equipment while viewing the on-screen information.

3. Description of Modification

Figure 15:
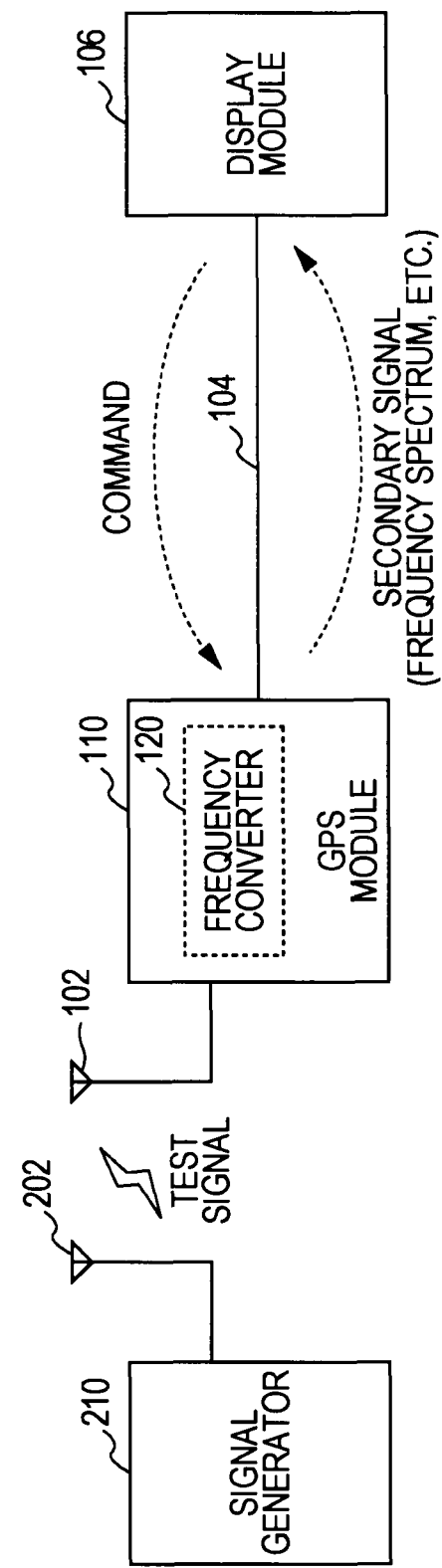
FIG. 15 is a schematic diagram illustrating an exemplary configuration of a system for testing an antenna or frequency converter.

The above-described configuration in accordance with an embodiment of the present invention is applicable not only to noise observation, but also to testing the antenna or the frequency converter in the GPS module. FIG. 15 is a schematic diagram illustrating an exemplary configuration of a system for testing an antenna or frequency converter in a GPS module by applying the configuration of the GPS module 110 and display module 160 in accordance with the embodiment described in the foregoing.

FIG. 15 shows the antenna 102, signal line 104, GPS module 110, and display module 160 in accordance with the embodiment shown by way of example in FIG. 7. Additionally, a test antenna 202 is placed at a position facing the antenna 102, and a signal generator 210 is connected to the test antenna 202.

The signal generator 210 causes a test signal to be generated and output to the test antenna 202. The test signal may be, for example, a continuous wave (CW) on the GPS carrier frequency 1575.42 MHz at a predetermined level, such as −110 dBm. Once generated, the test signal is transmitted from the test antenna 202 to the antenna 102. Subsequently, the signal received by the antenna 102 is frequency-converted in the frequency converter 120 of the GPS module 110, and the frequency spectrum or statistical data for the resulting IF signal is displayed on the screen of the display module 160. In so doing, the performance of the frequency converter 120 in the GPS module 110 can be tested on the basis of, for example, the ratio between the CW level in the frequency spectrum versus the level of the other frequency components. Furthermore, the antenna 102 can also be tested by replacing the antenna 102 connected to the GPS module 110 during observation.

The foregoing thus describes a preferred embodiment of the present invention in detail and with reference to the attached drawings. However, it should be appreciated that the present invention is not limited to such an example. It is obvious to those skilled in the art that various modifications and substitutions may be made without departing from the scope of the technical ideas disclosed in the attached claims, and that any such modifications or substitutions are understood to be naturally included in the technical scope of the present invention.

By way of example, the present specification primarily describes signal processing related to global navigation satellite systems (GNSS) such as GPS. However, an embodiment of the present invention described above is also applicable to general spread spectrum wireless systems.

The present application contains subject matter related to that disclosed in Japanese Priority Patent Application JP 2009-089218 filed in the Japan Patent Office on Apr. 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus, comprising:
a synchronizer configured to acquire synchronization with a spreading code of an intermediate frequency signal that is obtained by converting a frequency of a received signal into a predetermined intermediate frequency;
a demodulator configured to demodulate a message included in the intermediate frequency signal synchronized by the synchronizer;
a measuring unit configured to output a primary signal to a predetermined signal line; and
a secondary signal output unit configured to attach a predetermined header to a secondary signal and output the result to the predetermined signal line, wherein
the secondary signal includes at least the intermediate frequency signal, or a signal generated from the intermediate frequency signal,
the received signal is received from a satellite in a global positioning system,
the primary signal includes results of measuring at least one of position, velocity, and time of the signal processing apparatus as measured based on the message that is demodulated by the demodulator.

2. The signal processing apparatus according to claim 1, wherein
the secondary signal includes a frequency spectrum that is generated by applying a Fourier transform to the intermediate frequency signal.

3. The signal processing apparatus according to claim 1 or 2, wherein
the secondary signal includes data obtained by statistically analyzing a frequency spectrum that is generated as a result of applying a Fourier transform to the intermediate frequency signal.

4. The signal processing apparatus according to claim 1, further comprising:
a frequency converter configured to generate the intermediate frequency signal by converting the frequency of the received signal into the predetermined intermediate frequency, wherein
the received signal is received from the satellite in the global positioning system.

5. The signal processing apparatus according to claim 1, wherein
the secondary signal output unit is further configured to attach to the secondary signal a header that includes an ID code that identifies a type of signal included in the secondary signal.

6. An information processing apparatus, comprising:
a primary signal acquirer configured to acquire a primary signal from a predetermined signal line; a secondary signal acquirer configured to acquire a secondary signal from the predetermined signal line; and a display unit configured to display, on a screen, data corresponding to the primary signal acquired by the primary signal acquirer, and data corresponding to the secondary signal acquired by the secondary signal acquirer, wherein the primary signal includes at least one of position, velocity, and time of the information processing apparatus as measured based on an intermediate frequency signal obtained by converting a frequency of a received signal into an intermediate frequency, the received signal is received from a satellite in a global positioning system, the secondary signal includes at least the intermediate frequency signal, or a signal generated from the intermediate frequency signal, and the secondary signal acquirer acquires the secondary signal from signals output to the predetermined signal line by acquiring a signal whose attached header includes an ID code corresponding to the secondary signal.

7. The information processing apparatus according to claim 6, further comprising:
a data processor configured to generate a frequency spectrum by applying a Fourier transform to the intermediate frequency signal, wherein
the secondary signal includes the intermediate frequency signal, and
the display unit displays, on the screen, the frequency spectrum generated by the data processor.

8. The information processing apparatus according to claim 6, further comprising:
a data processor configured to statistically analyze a frequency spectrum included in the secondary signal, wherein
the secondary signal includes the frequency spectrum generated by applying a Fourier transform to the intermediate frequency signal, and
the display unit displays, on the screen, data obtained as a result of the analysis by the data processor.

9. A signal processing method, comprising the steps of:
acquiring synchronization with a spreading code of an intermediate frequency signal that is obtained by converting a frequency of a received signal into a predetermined intermediate frequency;
demodulating a message included in a synchronized intermediate frequency signal;
outputting a primary signal to a predetermined signal line; and
attaching a predetermined header to a secondary signal and outputting the result to the predetermined signal line, wherein
the secondary signal includes at least the intermediate frequency signal, or a signal generated from the intermediate frequency signal,
the received signal is received from a satellite in a global positioning system, and
the primary signal includes results of measuring at least one of position, velocity, and time of a signal processing apparatus as measured based on the demodulated message.

10. A non-transitory computer readable medium including executable instructions, which when executed by a processor, cause the processor to function as:
a synchronizer configured to acquire synchronization with a spreading code of an intermediate frequency signal that is obtained by converting a frequency of a received signal into a predetermined intermediate frequency;
a demodulator configured to demodulate a message included in the intermediate frequency signal synchronized by the synchronizer;
a measuring unit configured to output a primary signal to a predetermined signal line; and
a secondary signal output unit configured to attach a predetermined header to a secondary signal and output the result to the predetermined signal line, wherein
the secondary signal includes at least the intermediate frequency signal, or a signal generated from the intermediate frequency signal,
the received signal is received from a satellite in a global positioning system, and
the primary signal includes the results of measuring at least one of position, velocity, and time of an apparatus as measured based on the message that was demodulated by the demodulator.

11. A data display method executed using an information processing apparatus configured to display data on a screen, the method comprising the steps of: acquiring a primary signal from a predetermined signal line;

acquiring a secondary signal from the predetermined signal line; and displaying, on the screen, data corresponding to the primary signal, and data corresponding to the secondary signal, wherein the primary signal includes at least one of position, velocity, and time of the information processing apparatus as measured based on an intermediate frequency signal obtained by converting a frequency of a received signal into an intermediate frequency, the received signal is received from a satellite in a global positioning system, the secondary signal includes at least the intermediate frequency signal, or a signal generated from the intermediate frequency signal, and the step of acquiring the secondary signal from signals output to the predetermined signal line further includes acquiring a signal whose attached header includes an ID code corresponding to the secondary signal.

12. A non-transitory computer readable medium including executable instructions, which when executed by a processor that controls an information processing apparatus, cause the processor to function as: a primary signal acquirer configured to acquire a primary signal from a predetermined signal line;

a secondary signal acquirer configured to acquire a secondary signal from the predetermined signal line; and a display unit configured to display, on a screen, data corresponding to the primary signal acquired by the primary signal acquirer, and data corresponding to the secondary signal acquired by the secondary signal acquirer, wherein the primary signal includes at least one of position, velocity, and time of the information processing apparatus as measured based on an intermediate frequency signal obtained by converting a frequency of a received signal into an intermediate frequency, the received signal is received from a satellite in a global positioning system, the secondary signal includes at least the intermediate frequency signal, or a signal generated from the intermediate frequency signal, and the secondary signal acquirer acquires the secondary signal from signals output to the predetermined signal line by acquiring a signal whose attached header includes an ID code corresponding to the secondary signal.

* * * * *